Figure 1:
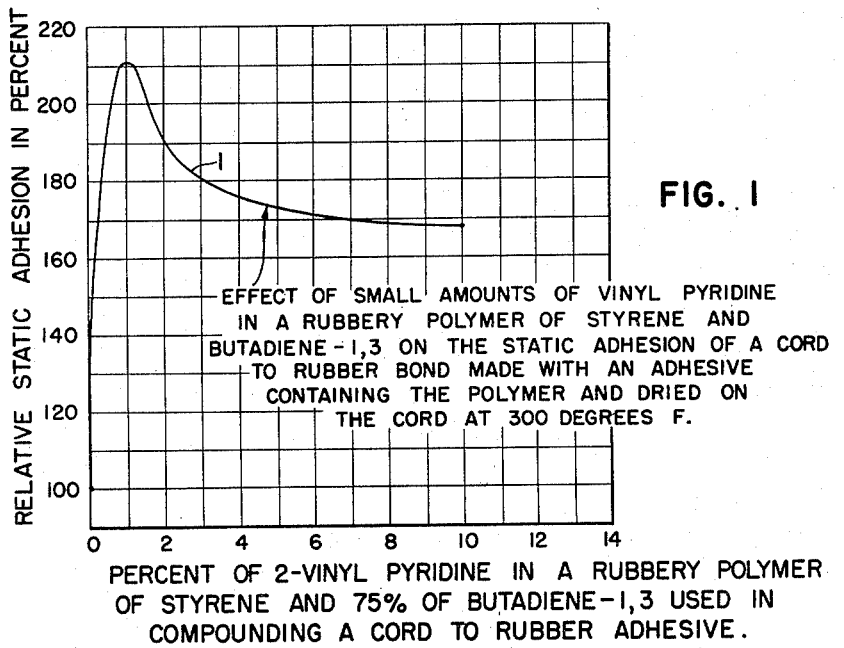

Dec. 24, 1957  W. D. WOLFE  2,817,616
BONDED COMPOSITE STRUCTURE CONTAINING OZONE
RESISTANT TRIPOLYMER RUBBER COMPOSITION
AND ADHESIVE
Filed April 26, 1954  2 Sheets-Sheet 1

INVENTOR.
WILLIAM D. WOLFE
BY
ATTORNEY

INVENTOR.
WILLIAM D. WOLFE
BY
R. L. Miller
ATTORNEY

2,817,616

BONDED COMPOSITE STRUCTURE CONTAINING OZONE RESISTANT TRIPOLYMER RUBBER COMPOSITION AND ADHESIVE

William D. Wolfe, Cuyahoga Falls, Ohio, assignor to The Goodyear Tire & Rubber Company, Akron, Ohio, a corporation of Ohio Application April 26, 1954, Serial No. 425,394

6 Claims. (Cl. 154—52)

This invention relates to new compositions of matter and their use as adhesives, particularly in the bonding of a cord to rubber.

In the manufacture of rubber articles, particularly pneumatic tires and mechanical rubber goods, the life of these articles depends to a great extent upon the reinforcing cord employed, and more particularly upon the ability to properly bond the cord to the rubber. Reinforcing materials used include cord and fabric made therefrom. The cord may be made of a natural textile material, as for example cotton, or a cellulosic material such as rayon, or a polyamide reaction product, as for example nylon, or a polyester product such as Dacron. Reinforcing of the rubber may also be accomplished by the use of cable made out of fine steel wire. Regardless of the kind of reinforcement used, each material presents a different adhesive problem. Considerable experience has been gained in bonding cotton cord to natural rubber since these materials have been used together over a long period of time. Less is known about the proper bonding of rayon, nylon and now Dacron to both natural and especially synthetic rubber since these materials have only been recently employed in the pneumatic tire field. Originally the problem of bonding the cord to rubber was solved by the use of natural rubber latex, but with tires being subjected to higher speeds and loads, improvements in the bonding of the cord to the rubber had to be found. Some improvements were made by adding compounding ingredients to the natural rubber latex, including proteinacious materials such as casein. Particularly improved bonding of cord to rubber was achieved when phenolaldehyde type resins were compounded with the rubber latex. Further improvements were made when the rubbery butadiene/styrene copolymer latex was substituted for the natural rubber latex and used in combination with the phenolaldehyde resin, particularly resorcinol formaldehyde resin.

Improvements in tire construction were also made by using cord made of a material other than cotton. Advantages were obtained by using rayon and nylon cord. Even improvements in the rayon and nylon cord were made by subjecting the cord to extremely high conditions of tension while being treated with an adhesive and also by drying the adhesive onto the cord under extremely high conditions of temperature. Unfortunately, under these extreme conditions of tension and temperature, the adhesive compositions known and used at this time did not produce the same desirable bond as was otherwise produced under less drastic processing conditions. Also the increased loading conditions placed upon tires, particularly truck tires, generates extremely high internal heat that greatly reduces the useful life of the tire because of the failure of the bond between the cord and the rubber. It therefore became necessary to discover an adhesive composition that would withstand the rigorous conditions employed in treating the cord as well as maintain high adhesion between the cord and the rubber when the composite bonded structure of cord and rubber, for example in the form of a truck tire and the like, is used under extreme loading conditions and high speed both conducive to the generation of high internal temperatures and the ultimate breakdown of the bond between the cord and the rubber. It is now recognized that the presence of ozone in the air contributes to the degradation of the rubber and also the bond between the cord and the rubber.

In the attempt to discover a new adhesive, it was found to be desirable to continue with the use of a GR–S base type of adhesive in view of the knowledge possessed for its use. Many changes were made in the compounding of the basic GR–S/resorcinol formaldehyde resin adhesive, especially in regard to the addition of a third component, but none of these new formulations produced the necessary results. Of the various agents used in attempting to modify the adhesive to advantage, vinylpyridine compounds in particular were tried by adding them to the GR–S/resorcinol formaldehyde mixture. No desirable results were obtained. The addition of the 2-vinylpyridine monomer to a GR–S/resorcinol-aldehyde mixture had no desirable effect in producing a good cord to rubber bond at high temperatures. The addition products resulting from the reaction of 2-vinylpyridine and normal dodecyl mercaptan were also added to the same basic adhesive mixture of GR–S and resorcinol/aldehyde resin without getting desirable adhesions.

It was then quite unexpectedly discovered that the desired adhesive bond between a cord, particularly a rayon or nylon cord, and rubber can be achieved when using a rubbery copolymer of butadiene and styrene which has been polymerized in the presence of a nitrogen-containing heterocyclic modifying agent of the type selected from the class known as vinylpyridines and having the structural formula

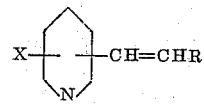

in which R denotes hydrogen or an organic radical, preferably one containing 3 to 9 carbons and X is hydrogen or an alkyl group, preferably containing 1 to 3 carbons. These groups may be in the 2-, 3- or 4-position. It is preferred that the vinyl group be in the 2-position.

And more unexpectedly was it found that this specific class of modifying agents produced the unexpected adhesive bond between the cord and rubber when the agent was used in an amount not exceeding about three percent of the total monomers being reacted. The most significant discovery, however, being the fact that as little as 0.1% of the vinylpyridine monomer produced a desirable change in the resulting rubbery polymer of butadiene and styrene that now permitted the use of the rubbery polymer under aggravated ozone conditions as well as without premature failure of the bond between the cord and the rubber under extremely high temperature conditions.

All of the rubbery polymers of butadiene and styrene used here were made in accordance with the following formulation:

| | |
|---|---|
| Butadiene-1,3 monomer | 40 to 95% of total monomers. |
| Styrene monomer | 60 to 5% of total monomers. |
| Vinylpyridine monomer | 0 to 15% of total monomers. |
| Water | Dependent upon solids desired. |
| Emulsifying agent | 2 to 6 parts per 100 parts of monomers. |
| Additive | 0 to 0.5 part per 100 parts of monomers. |
| Catalyst | 0.1 to 0.5 part per 100 parts of monomers. |
| Short stop | 0.001 to 0.1 part per 100 parts of monomers. |
| Antioxidant | 1.0 to 2.0 parts per 100 parts of monomers. |
| Temperature | 45 to 55° C. |
| Time | 10 to 25 hours. |

The reaction involving the above formulation is carried out by making a soap solution of a portion of the water, and a catalyst solution with the remainder of the water, and then mixing these two solutions at a reduced temperature of about 40° C. The additive is then added to the styrene monomer, and this styrene mixture is then added to the soap solution containing the catalyst. The vinylpyridine, if any, is next added to the mixture, after which the butadiene is charged to the reaction vessel and the total mixture heated and agitated for the required period of time. When the reaction has gone to the desired conversion value, the short stop and antioxidant are added to the latex mixture. Generally the solids content of the latex ranges from 25 to 35%, depending upon the amount of water used and the percent conversion.

Any desirable emulsifying agent may be used, including potassium oleate or sodium rosinate. Any desirable additive or chain terminating agent may be used, including dodecyl mercaptan, and tertiary butyl mercaptan. Any of the usual polymerization catalysts operable in this reaction may be used, such as hydrogen peroxide, benzoyl peroxide, ammonium persulfate, potassium persulfate, and sodium perborate. Any desirable short stop agent may be used, including di-ter butyl hydroquinone, dinitro chlorobenzene, and sodium dimethyl dithiocarbamate. Any of the well-known antioxidants employed in the preservation of the rubber against oxidation may be used, including phenyl beta naphthylamine. Ordinarily the reaction is carried out at a temperature of from about 40 to about 60° C. and it is preferred to use about 50° C. The reaction generally takes from about 10 to about 20 hours, at the end of which time anywhere from 75 to 95% of the monomers being reacted are converted to polymers.

Butadiene-1,3 is the preferred diene hydrocarbon monomer to be used in making the rubbery copolymer of this invention. Butadiene may be used in amounts from about 40 to 95% and preferably from 50 to 95%, and most preferably from 70 to 90%. However, other 1,3-diene hydrocarbon monomers may be used, including isoprene, 2,3-dimethyl-1,3-butadiene, 2-ethyl-1,3-butadiene, etc.

The most desirable results are obtained when using styrene as the vinyl aromatic monomer to be used in making the rubbery copolymer. The amount of styrene monomer to be used will be an amount sufficient to make 100% based upon the total monomers being reacted.

It has been found that 2-vinylpyridine is the preferred vinylpyridine to be used in bringing about the unexpected change in the rubbery styrene/butadiene polymer. However, other vinylpyridines also produce a desirable result, including 3-vinylpyridine, 4-vinylpyridine, 2-methyl-5-vinylpyridine, 5-ethyl-2-vinylpyridine, 2-methyl-6-vinylpyridine, and 2-ethyl-4-vinylpyridine.

Although desirable results are obtained in an adhesive made from a rubbery copolymer in which as little as 40 and as much as 95% of butadiene are present, it is preferred to make the rubbery copolymer using about 90% of butadiene, 9% of styrene and 1% of 2-vinylpyridine. Under these specific conditions of formulation, the bond, even under high conditions of temperature, is so effective that failure occurs either in the cord or the rubber rather than in the bond between the cord and the rubber.

The adhesives used throughout the disclosure were prepared in accordance with the following formulation:

| Material: | Parts |
| --- | --- |
| Water | 196.75 |
| Resorcinol | 10.15 |
| Formalin (37%) | 13.10 |
| Sodium hydroxide (10%) | 10.0 |
| Rubber latex (32%) | 270.0 |

The adhesive was prepared at about 25° C, by dissolving the resorcinol in the water, followed by addition of the formalin, the sodium hydroxide, and finally the rubber latex, all with agitation. The latex may be added to the mixture of resorcinol, formaldehyde and sodium hydroxide immediately after the mixture is made or any time thereafter up to 2 hours. The completed mixture was permitted to age for 12 hours at 25° C. before using. The rubbery latex was made in accordance with the formulation set forth for making the rubbery polymer of butadiene and styrene, using various amounts of 2-vinylpyridine ranging from 0 to 15%. Any stage A phenolaldehyde resin may be used, but it is preferred to use the water-soluble resorcinol/formaldehyde resin. The resin is prepared by reacting equal molar amounts of a phenol with an aldehyde, but it is preferred to use a molar excess of an aldehyde up to 2.5 mols per mol of a phenol in the presence of an alkaline catalyst until a water-soluble product is produced.

The rayon cord was treated with the adhesive by dipping the cord into the adhesive and then drying the adhesive on the cord for 3 minutes at a temperature of from 250° F. to 400° F. as indicated on each chart of the drawing. The treated cord was then embedded and cured in a compounded natural rubber stock and tested, all in accordance with the well-known H-block method as described in India Rubber World 114, 213 (1946).

The unexpected results obtained when using small amounts of vinylpyridine in making a rubbery polymer of styrene and 75% butadiene-1,3 for use in making a cord-to-rubber adhesive may be seen by referring to the various figures in the drawing.

Curve 1 of Fig. 1 shows the effect of small amounts of vinylpyridine in a rubbery polymer of styrene and 75% of butadiene on the bond between a rayon cord and natural rubber using an adhesive containing the rubbery polymer. A test specimen was made in which a rayon cord was bonded in rubber using a rubbery polymer of 75% of butadiene-1,3 and 25% of styrene, but containing no vinylpyridine. The value obtained for the static adhesion was rated at 100% as indicated on the zero ordinate of curve 1. It is interesting to observe that a sharp increase in static adhesion was produced when a 2-vinylpyridine modified rubbery polymer was used in making the adhesive for binding the cord to the rubber. The increase in static adhesion reached a maximum of 210% when as little as 1% of 2-vinylpyridine was used with 75% of butadiene-1,3 and 24% of styrene in making the rubbery polymer. It is significant to notice that the static adhesion decreases from a value of 210% when using a polymer containing 1% of vinylpyridine to a value of 175% when using a polymer containing as much as 5% of the 2-vinylpyridine. Thus it becomes apparent that a critically small amount of 2-vinylpyridine in the rubbery polymer produces exceptional improvements in the static adhesion of a rayon cord to rubber when using an adhesive containing a vinylpyridine modified polymer.

Figure 2:
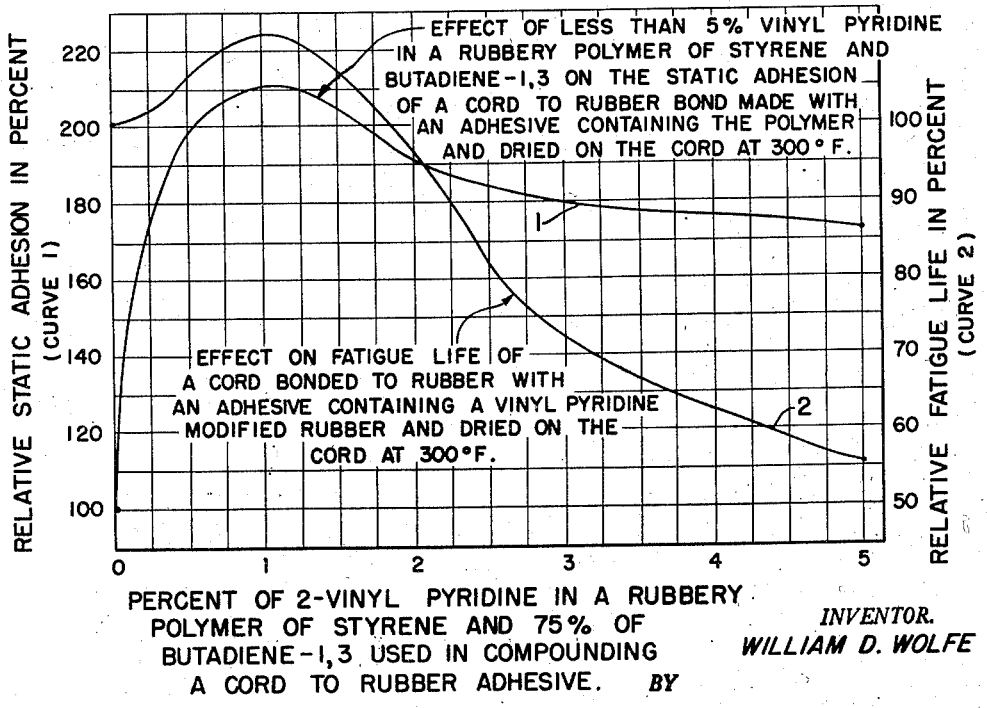

Fig. 2 of the drawing shows an enlarged portion of the curve 1 of Fig. 1 for various values of 2-vinylpyridine used in the rubbery polymer below 5%. The same relative values based on 100% for the unmodified polymer adhesive used in Fig. 1 were also used here. This enlarged portion of curve 1 emphasizes the unexpected improvement in adhesion when using less than 1% of vinylpyridine in making the rubbery polymer.

Curve 2 of Fig. 2 shows the effect on the fatigue life of rayon cord used to reinforce a rubber tubular structure when the cord is bonded to the rubber with an adhesive using a rubbery polymer of styrene and 75% of butadiene-1,3 and various amounts of the 2-vinylpyridine. The test specimen was constructed and tested in accordance with the method set forth in U. S. Patent 2,412,524. A test specimen comprising a tubular member of rubber reinforced with rayon cord and bonded to the rubber with an adhesive containing a rubbery polymer of 25% styrene and 75% of butadiene-1,3 was tested and the value obtained was rated at 100% as indicated on the zero ordinate of curve 2. Further test specimens of rubber, all reinforced with rayon cord and bonded to the rubber with an adhesive containing a rubbery polymer of styrene and 75% of butadiene-1,3 and various amounts of 2-vinylpyridine, ranging from .1% to 5%, were tested. As the amount of 2-vinylpyridine in the rubbery polymer was increased to 1%, the fatigue life of the cord improved gradually to a value of 110% and fell off to a value of 55% as the amount of 2-vinylpyridine was increased up to 5%. Curve 2 shows how critical it becomes to use small amounts of vinylpyridine in making the rubbery polymer of styrene and butadiene used in making a cord-to-rubber adhesive for use in constructing a fatigue resistant structure of rubber reinforced with cords.

Figure 3:
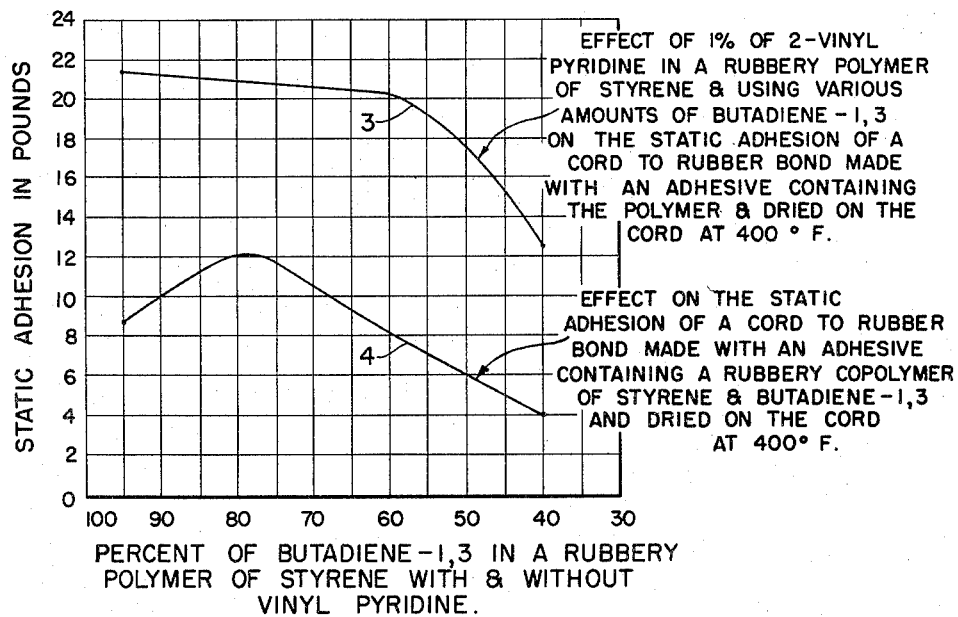

Curve 3 of Fig. 3 shows the consistently higher static adhesion values obtained when using 1% of 2-vinylpyridine in rubbery polymers of styrene made using various amounts down to 40% of butadiene-1,3, while curve 4 shows consistently lower static adhesion values under identical conditions of testing when using a rubbery styrene/butadiene copolymer in which no vinylpyridine has been added.

Figure 4:
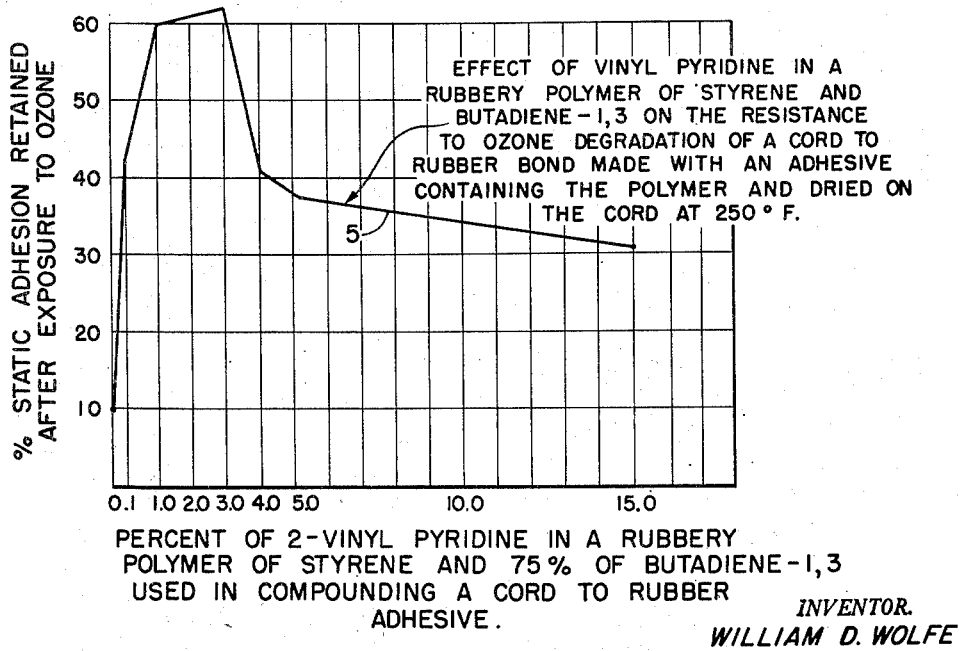

Curve 5 of Fig. 4 is of particular interest in showing the effect a small amount of vinylpyridine has in producing an ozone resistant cord-to-rubber bond made with an adhesive containing a rubbery polymer of styrene, butadiene and vinylpyridine. Curve 5 represents a comparison in percentage between the adhesion obtained for a cord-to-rubber bond using a cord treated with an adhesive dried thereon in air containing ozone and the adhesion obtained for a cord treated with the same adhesive dried thereon in air not containing ozone. Thus the curve shows that the static adhesion value obtained for a cord treated with an adhesive containing a rubbery polymer of 75% of butadiene-1,3 and 25% of styrene and dried thereon in the presence of air containing ozone, was only 10% of the static adhesion value obtained for a cord treated with the same adhesive but dried on the cord in the presence of air alone, whereas the static adhesion value obtained for a cord treated with an adhesive containing a rubbery polymer of 74.8% of butadiene-1,3, 24% of styrene and 0.1% of 2-vinylpyridine and dried thereon in the presence of air containing ozone, was 42% of the value obtained for a cord treated with the same adhesive dried in air alone. Similarly, the percentage of static adhesion retained increased to 60% when 1% of 2-vinylpyridine was used in the rubber, and to 62% when 3% of 2-vinylpyridine was used in the rubber in making the adhesive. When more than 3% of 2-vinylpyridine was used in making the rubber used in the adhesive, the static adhesion retained fell off sharply at 4% and continued to fall off as the amount of 2-vinylpyridine used was increased to 15%.

In using the adhesive of this invention in coating cord or fabric by passing them through a dip tank containing the adhesive, it is observed that the squeeze rolls through which the cord or fabric passes do not become encrusted with a hardened layer of the adhesive even over long periods of use, thus indicating the mechanical stability of the adhesive. However, when the same adhesive is used with the exception that the conventional rubbery copolymer of styrene and butadiene is used in place of the modified rubber of this invention, an encrusted layer of the adhesive forms on the squeeze rolls after 24 hours of constant use.

It is also observed that when an adhesive comprising a vinylpyridine modified rubber latex and from about 10 to about 20% of a stage A resin is used to treat the cords, the adhesive does not tend to stiffen on the cord when dried at temperatures as high as 400° F., whereas the same adhesive using the conventional rubbery copolymer of styrene and butadiene does tend to stiffen the cord when dried at these high temperatures, as well as form a much weaker bond between the cord and the rubber. It becomes exceedingly important in the manufacture of softer riding tires to have a cord or fabric that is not stiff and therefore flexes readily.

It is preferred to use resin/rubber latex blends containing from 10 to 20% of resin and 90 to 80% of rubber for tire cord treatment but other ratios of resin and rubber latex may be used for other uses. Thus progressively more rigid adhesives may be made using from 50 to 95% of resin and 50 to 5% of rubber. These adhesives may be desirably used in laminating plies of wood or metal. It is preferred to have from 5 to 15% solids when the adhesive is to be applied to a cord from a dip tank.

All parts and all percents used throughout the disclosure are by weight.

While certain representative embodiments and details have been shown for the purpose of illustrating the invention, it will be apparent to those skilled in this art that various changes and modifications may be made therein without departing from the spirit or scope of the invention.

What is claimed is:

1. A cord-to-rubber bond producing adhesive composition comprising a rubbery polymer resulting from the aqueous emulsion polymerization of a mixture comprising 40 to 95% of butadiene, styrene and about 1% of a compound selected from the group consisting of 2-vinylpyridine, 3-vinylpyridine, 4-vinylpyridine and the alkyl substituted vinylpyridines having the structural formula

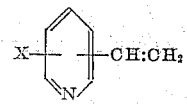

in which X is an alkyl group containing 1 to 3 inclusive carbon atoms and in which the group CH:CH₂ is in a position on the pyridine ring selected from the group consisting of 2-, 3- and 4-, and a heat-convertible polyhydric phenol aldehyde resol the rubbery polymer, resol and rubber being chemically reactive with each other under the influence of heat to produce the cord-to-rubber bond.

2. A cord-to-rubber bond producing adhesive composition comprising 95 to 10% of a rubbery polymer resulting from the aqueous emulsion polymerization of a mixture comprising 40 to 95% of butadiene, styrene and about 1% of a compound selected from the group consisting of 2-vinylpyridine, 3-vinylpyridine, 4-vinylpyridine and the alkyl substituted vinylpyridines having the structural formula

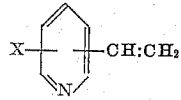

in which X is an alkyl group containing 1 to 3 inclusive carbon atoms and in which the group CH:CH₂ is in a position on the pyridine ring selected from the group consisting of 2-, 3- and 4-, and 5 to 90% of a heat-convertible resorcinol-formaldehyde resol the rubbery polymer, resol and rubber being chemically reactive with each other under the influence of heat to produce the cord-to-rubber bond.

3. A cord-to-rubber bond producing adhesive composition comprising 85% of a rubbery polymer resulting from the aqueous emulsion polymerization of a mixture comprising 40 to 95% of butadiene, styrene and about 1% of a compound selected from the group consisting of 2-vinylpyridine, 3-vinylpryridine, 4-vinylpyridine and the alkyl substituted vinylpyridines having the structural formula

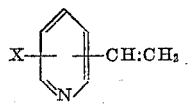

in which X is an alkyl group containing 1 to 3 inclusive carbon atoms and in which the group CH:CH$_2$ is in a position on the pyridine ring selected from the group consisting of 2-, 3- and 4-, and 15% of a heat-convertible resorcinol-formaldehyde resol the rubbery polymer, resol and rubber being chemically reactive with each other under the influence of heat to produce the cord-to-rubber bond.

4. A bonded composite structure comprising a reinforcing cord embedded in a vulcanized rubber and bonded thereto under the influence of heat by an adhesive composition comprising a rubbery polymer resulting from the aqueous emulsion polymerization of a mixture comprising 40 to 95% of butadiene, styrene and about 1% of a compound selected from the group consisting of 2-vinylpyridine, 3-vinylpyridine, 4-vinylpyridine and the alkyl substituted vinylpyridines having the structural formula

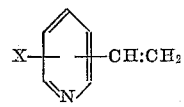

in which X is an alkyl group containing 1 to 3 inclusive carbon atoms and in which the group CH:CH$_2$ is in a position on the pyridine ring selected from the group consisting of 2-, 3- and 4-, and a heat-convertible resorcinol-formaldehyde resol.

5. A bonded composite structure comprising a cellulosic cord embedded in a vulcanized rubber and bonded thereto under the influence of heat by an adhesive composition comprising a rubbery polymer resulting from the aqueous emulsion polymerization of a mixture comprising 40 to 95% of butadiene, styrene and about 1% of a compound selected from the group consisting of 2-vinylpyridine, 3-vinylpyridine, 4-vinylpyridine and the alkyl substituted vinylpyridines having the structural formula

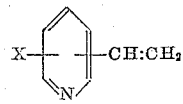

in which X is an alkyl group containing 1 to 3 inclusive carbon atoms and in which the group CH:CH$_2$ is in a position on the pyridine ring selected from the group consisting of 2-, 3- and 4-, and a heat-convertible resorcinol-formaldehyde resol.

6. A bonded composite material comprising a reinforcing cord embedded in a vulcanized rubber and a composition comprising a rubbery polymer resulting from the aqueous emulsion polymerization of a mixture comprising 40 to 95% of butadiene, styrene and 5-ethyl-2-vinylpyridine, and a polyhydric phenolaldehyde resin forming a bond under the influence of heat between the cord and rubber.

References Cited in the file of this patent
UNITED STATES PATENTS
2,561,215    Mighton  ------------ July 17, 1951

OTHER REFERENCES

Rinne et al.: "Effect of 2-Vinylpyridine on Properties of GR–S Polymers," Ind. Eng. Chem., volume 40, No. 8, August 1948, pages 1437–1440.